United States Patent [19]

Meister

[11] Patent Number: 4,497,762

[45] Date of Patent: Feb. 5, 1985

[54] METHOD AND APPARATUS FOR THE PRODUCTION OF JOINTING BANDS WITH EMBEDDED REINFORCING PROFILES WHICH RUN AT RIGHT ANGLES TO THE LONGITUDINAL AXIS OF THE BAND

[75] Inventor: Winfried Meister, Hordenbachstrasse 70, 5600 Wuppertal, Fed. Rep. of Germany

[73] Assignee: Winfried Meister, Fed. Rep. of Germany

[21] Appl. No.: 474,022

[22] Filed: Mar. 10, 1983

[30] Foreign Application Priority Data

Mar. 15, 1982 [DE] Fed. Rep. of Germany ....... 3209357

[51] Int. Cl.³ ............................................... B29F 3/10
[52] U.S. Cl. ............................... 264/172; 264/177 R; 425/114; 425/131.1
[58] Field of Search ........... 264/172, 174, 149, 177 R, 264/150; 425/131.1, 114, 113

[56] References Cited

U.S. PATENT DOCUMENTS

| 2,962,813 | 12/1960 | Kreidler | 156/244.12 |
|---|---|---|---|
| 3,529,330 | 9/1970 | Martens | 425/114 |
| 3,758,247 | 9/1973 | Deegen | 425/114 |
| 4,165,957 | 8/1979 | Kertscher | 264/174 |
| 4,274,821 | 6/1981 | Kiemer | 425/114 |
| 4,295,812 | 10/1981 | Hoddinot | 425/114 |
| 4,341,509 | 7/1982 | Harlow | 425/114 |

FOREIGN PATENT DOCUMENTS

| 2507154 | 8/1975 | Fed. Rep. of Germany | 264/174 |
|---|---|---|---|
| 3011225 | 10/1981 | Fed. Rep. of Germany | |
| 2463488 | 3/1981 | France | 156/500 |

Primary Examiner—Jeffery Thurlow
Attorney, Agent, or Firm—Jones & Askew

[57] ABSTRACT

A method of extrusion for the production of a plastic band profile with reinforcing profiles disposed and enclosed at right angles to the longitudinal axis of the band, arranged at a distance one from the other whereby two streams of plastic are brought together at a sharp angle to the longitudinal axis of extrusion and where the profiles are uniformly pushed from behind and in the direction of extrusion into the region of the angle where the two streams meet and where they are enveloped and taken with the plastic streams and extruded into the shape of the band profile. The two plastic streams are produced independently one from the other in two parallel planes one lying above the other and with respect to their flow parameters are independently controllable one from the other.

5 Claims, 1 Drawing Figure

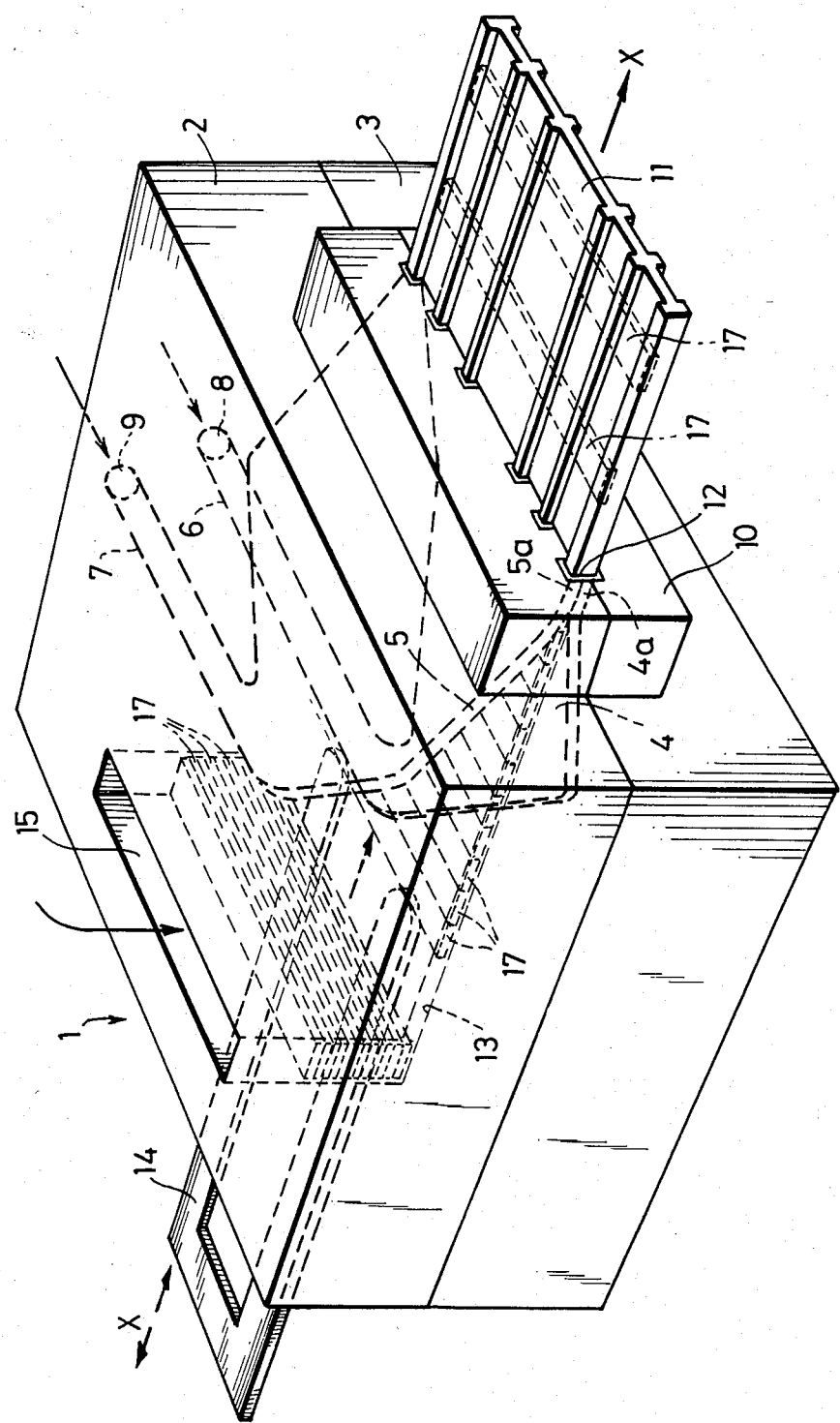

METHOD AND APPARATUS FOR THE PRODUCTION OF JOINTING BANDS WITH EMBEDDED REINFORCING PROFILES WHICH RUN AT RIGHT ANGLES TO THE LONGITUDINAL AXIS OF THE BAND

The present invention concerns a method of extrusion for the production of a plastic band profile with reinforcing profiles, dispersed and enclosed at right angles to the longitudinal axis of the band, arranged at a distance one from the other, whereby two streams of plastic are brought together at a sharp angle to the longitudinal axis of extrusion and where the profiles are strokewise pushed from behind and in the direction of extrusion into the region of the angle where the two streams meet and where they are enveloped and taken with the plastic streams and extruded into the shape of the band profile.

A method of extrusion is known from DE-OS No. 30 11 225. It is however disadvantageous there that the two streams of plastic cannot be regulated independently one from another so that it is necessary to direct the channels for the two streams absolutely identically so that in the region where they meet the speed of the stream and their flow properties are absolutely equal.

It is the object of the present invention to improve the method according to West German patent application No. 3011225 in such a manner that an independent control of the two plastic streams is possible.

According to the invention this is achieved by the fact that the two streams of plastic are produced in two parallel planes one lying above the other and which in respect of their flow parameters are controllable one independently from the other and preferably where each individual stream of plastic is produced by means of its own extruder. Whereas according to West German patent publication No. 3011225 both streams are produced by the division of a single extrusion stream, according to the present invention both streams are produced simultaneously in separate extruders. The extrusion parameters of these two extruders can be controlled independently one from the other so that any desired control of the two streams is possible and thereby an optimum accommodation of the flow parameters of the two streams in the region where they meet can result. In addition the method according to the invention has the advantage for example that the two extruders can be charged with plastic granules of different colours so that by means of the method according to the invention a two coloured band profile may be produced.

Furthermore the invention extends to an extrusion apparatus for the manufacture of a plastic band profile whereby the two stream channels exit from one extrusion channel whch comes out of a side face of the extruder head and whose opening is able to be connected to an extruder.

Further advantageous features of the method and the apparatus according to the invention are contained in the following description.

The invention is explained more precisely by means of the representative example in the accompanying drawing.

The Drawing FIGURE is an isometric view of an extrusion apparatus according to a preferred embodiment of the present invention.

An extrusion apparatus according to the invention consists of an extruder head 1, which is longitudinally divided into two halves 2, 3 namely into the upper half 2 and the lower half 3. Within the upper part and the lower parts are situated, at a sharp angle to the longitudinal axis of extrusion X—X, stream channels 4, 5. These stream channels come out of an extrusion channel 6, 7 which in turn come out of one of the sides of the extrusion head 1 and which have there an inlet opening 8, 9. Extruders, not shown, are coupled to these inlet openings. The extruder head and the two halves 2, 3 are again divided at right angles in the region of the stream channels and extrusion channels so that these may be machined in the extruder head. The extrusion channels 6, 7 make a right angle or an obtuse angle with the stream channels 4, 5 whereby the extrusion channels 6, 7 broaden out, funnel-like, in to the stream channel 4, 5 until the width of the stream channel is equivalent to the width of the subsequent band profile. A pre-profiling of the strands which subsequently from the whole band profile already occurs in the stream channels 4, 5 that is to a band formed profile which is rectangular in cross section. As a result of this pre-profiling to partial profiles in the still plastic condition a reduction in the back pressure occurs in the region of the angle where the two streams meet. The leading together of the two streams forming the two part strands occurs at a mouthpiece 10 attached to the extruder head. This mouthpiece 10 is connected directly at the region where the two stream channels 4, 5 meet. The part strands pre-profiled in the stream channels 4, 5 are slightly over dimensioned with respect to the thickness of a half of the band thickness of the final band profile 11 extruded in the mouthpiece. An extrusion channel 12 is machined within the mouthpiece 10 whose profile corresponds to the profile of the band which is to be extruded.

A slot like channel 13 ends at the region of the angle of the two stream channels 4, 5 and lies in the plane of the joint of the two halves 2, 3. This slot like channel begins in the extruder head 1 at the end opposite to the mouthpiece 10; into it projects a fork like slide 14 which can be pushed in the slot like channel and which is actuated by means of a pneumatic or hydraulic drive arrangement. The slide 14 in its withdrawn position ends with its foremost point directly before an inlet opening of a storage channel 15. The storage channel serves to hold profiles 17, which in turn serve to strengthen the extrusion band profile 11 from within.

The extrusion apparatus according to the invention operates as follows.

From the separate extruders, which are not shown and which are connected to the inlet openings 8, 9 the plasticized plastic mass is pressed through the extrusion channels 6, 7 into the stream channels 4, 5 so that a pre-profiling of the plasticized plastic mass takes place in the stream channels 4, 5. The two pre-profiled streams 4a, 5a flow together in the region of the angle of the stream channels 4, 5 whereby at the same time in the region of the angle where the two part strands meet profile 17 is uniformly pushed from behind in the direction of the extrusion; they are taken with the part strands and are enveloped in the mouthpiece 10 whereby at the same time the final shaping takes place in the mouthpiece while the plastic mass is still in a plastic condition. The introduction of the profile between the two part strands 4a, 5a takes place exactly in the centre so that in the final extrusion profile 11 the reinforcing profiles are centrally based. By means of the method according to the invention and because of the fact that the final profiling takes place in the mouthpiece 10 whilst the part strands are still in a plastic condition there results a single band profile within which the reinforcing profile is fully enclosed. By means of the extrusion process according to the invention there results in the region of the reinforcing profile 17 a displacement of material so that in this region a reduction in the wall thickness of the plastic profile is produced because the thickness of the plastic band profile 11 is the same over its total area if the longitudinal ribs are ignored.

In the given example the reinforcing profiles 17 are regularly introduced from behind by means of the slide 14 in the region of the angle where the two part strands 4a, 5a meet. Similarly it is also possible to arrange the profiles 17 in a store outside of the extruder head 1 and to push them in sideways at an angle of 90° to the direction of extrusion and then by means of the slide 14 to push them forwards into the junction of the part strands 4a, 5a.

In the given example thw two inlet openings 8, 9 are arranged in a plane one over the other so that the extrusion channels 6, 7 run in two parallel planes lying one above the other. It is within the scope of the invention if the two extrusion channels 6, 7 do not run parallel one over the other but for example if the upper extrusion channel 6 runs at an angle to the direction of extrusion so that the two extruders which have to be connected are not located one above the other but one beside the other which allows a more compact structure to be obtained.

I claim:

1. A method of extrusion for the production of a plastic band profile with reinforcing profiles disposed and enclosed at right angles to the longitudinal axis of the band and arranged at a distance one from the other, whereby two streams of plastic are brought together at a sharp angle to the longitudinal axis of extrusion and where the profiles are strokwise pushed from behind and in the direction of extrusion into the region of the angle where the two streams meet and where the profiles are enveloped and taken with the plastic streams and extruded into the shape of the band profile, characterized in that:

the two plastic streams are produced independently one from the other in two parallel planes, one lying above the other and the flow parameters of the two plastic streams being controllable independently one from the other; and the two streams are preprofiled before they meet and while they are still in a plastic condition whereby the strands which are produced from the streams possess a width which conforms with the width of the final band profile and possess a height which provides a small overdimension with respect to one-half the thickness of the profile band.

2. A method of extrusion according to claim 1 characterised in that each individual stream is produced by means of its own extruder.

3. Extrusion apparatus for the production of a plastic band profile according to the method whereby two streams of plastic material are brought together at a sharp angle to the longitudinal axis of extrusion, the extrusion apparatus comprising an extruder head divided longitudinally into two halves and stream channels one running above and one below the longitudinal plane division of the extruder head, the stream channels running together at a sharp angle to the plane of the longitudinal division and in the region of the angle where the stream channels meet is a slot-like channel of a pusher arrangement in the direction of extrusion ending in front of the region of the angle, characterized in that the two stream channels 4, 5 lead from respective extrusion channels 6, 7 which leads from a side face of the extruder head 1 and on the inlet opening 8, 9 of which an extruder may be connected.

4. Extrusion apparatus according to claim 3 characterised in that the extruder head halves 2, 3 are generally divided in the region of the stream channels 4, 5 and extrusion channels 6, 7.

5. Extrusion apparatus according to claim 3 characterised in that a mouthpiece 10 is located in immediate contact at the region of meeting of the two stream channels 4, 5 at the extruder head 1.

* * * * *